United States Patent
Forest et al.

(10) Patent No.: US 7,231,041 B2
(45) Date of Patent: Jun. 12, 2007

(54) METHOD, DEVICE, AND SYSTEM FOR SECURE MOTOR VEHICLE REMOTE KEYLESS ENTRY

(75) Inventors: Thomas M. Forest, Macomb Township, MI (US); Thomas E. Utter, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 763 days.

(21) Appl. No.: 10/643,436

(22) Filed: Aug. 19, 2003

(65) Prior Publication Data

US 2005/0041813 A1    Feb. 24, 2005

(51) Int. Cl.
*H04L 9/00* (2006.01)
*G05B 15/02* (2006.01)
*G05B 19/18* (2006.01)
*G05B 9/02* (2006.01)
*G05B 15/00* (2006.01)
*G05B 21/00* (2006.01)
*G05D 7/00* (2006.01)

(52) U.S. Cl. .................. 380/44; 380/45; 380/278; 380/283; 380/284; 700/9; 700/65; 700/79; 700/83; 700/274; 700/282

(58) Field of Classification Search ............... None
See application file for complete search history.

(56) References Cited

U.S. PATENT DOCUMENTS

| | | | | |
|---|---|---|---|---|
| 5,369,706 A | * | 11/1994 | Latka | 380/262 |
| 5,774,550 A | * | 6/1998 | Brinkmeyer et al. | 713/168 |
| 5,898,397 A | * | 4/1999 | Murray | 341/176 |
| 5,937,065 A | * | 8/1999 | Simon et al. | 380/262 |
| 5,978,483 A | * | 11/1999 | Thompson et al. | 380/262 |
| 6,026,165 A | * | 2/2000 | Marino et al. | 380/273 |
| 6,130,622 A | * | 10/2000 | Hussey et al. | 340/5.61 |
| 6,157,722 A | * | 12/2000 | Lerner et al. | 380/260 |
| 6,185,307 B1 | * | 2/2001 | Johnson, Jr. | 380/270 |
| 6,225,889 B1 | * | 5/2001 | Furuta et al. | 340/426.36 |
| 7,039,397 B2 | * | 5/2006 | Chuey | 455/418 |
| 7,050,947 B2 | * | 5/2006 | Selektor | 702/189 |
| 2003/0076968 A1 | * | 4/2003 | Rast | 381/124 |

OTHER PUBLICATIONS

Doug Conner, Cryptographic Techniques Secure Your Wireless Designs, Jan. 18, 1996, EDN, pp. 1-11, printed on Oct. 6, 2006.*

* cited by examiner

*Primary Examiner*—Kambiz Zand
*Assistant Examiner*—Benjamin E. Lanier
(74) *Attorney, Agent, or Firm*—Timothy J. Marsh

(57) ABSTRACT

Methods and apparatus are provided for sending an encrypted command message from a remote keyless entry device to a receiver in a motor vehicle. The method comprises defining a key generating key within the remote keyless entry device, and using that key generating key to generate a working key. The working key is transmitted from the remote keyless entry device to the receiver during a training session without transmitting the key generating key. The working key is modified each time the remote keyless entry device is placed in the training mode. After the training session, a message encrypted with the working key can be transmitted from the remote keyless entry device to the motor vehicle receiver where the encrypted message is decrypted with the working key.

22 Claims, 2 Drawing Sheets

METHOD, DEVICE, AND SYSTEM FOR SECURE MOTOR VEHICLE REMOTE KEYLESS ENTRY

TECHNICAL FIELD

The present invention generally relates to motor vehicle remote keyless entry systems, and more particularly relates to secure motor vehicle remote keyless entry systems that prevent an unauthorized entity from accessing an encryption key.

BACKGROUND

Remote keyless entry systems are widely used in connection with motor vehicles. The owner of the motor vehicle or another authorized person can, for example, unlock one or more of the vehicle doors, lock the vehicle doors, unlock the vehicle trunk, or sound an alarm by pressing one of a plurality of buttons on a remote keyless entry device, often referred to as a key fob or remote keyless entry (RKE) transmitter. The key fob or RKE transmitter transmits a command signal, by some form of modulated electromagnetic radiation, to a receiver in the motor vehicle. The signal includes the command (e.g., unlock the driver door) and, at least, an identifier that identifies to the receiver that this particular RKE transmitter is authorized to send such a command to this particular motor vehicle. Although the RKE transmitter provides a great convenience to the vehicle owner, it also presents various security issues. In order to overcome these security issues, it is common to encrypt the transmission from the RKE transmitter to the receiver. Initial attempts at security used a fixed encryption key for the transmission. Unauthorized persons could monitor and record a transmission from the RKE transmitter and could use the recorded transmission to gain unauthorized access to the vehicle at some later time.

To improve security, motor vehicle manufacturers adopted a "rolling code" method of encryption. The rolling code is base on some type of transmitter specific "secret" that is shared between the transmitter and the receiver. That secret information is used as an encryption key, or as the key to a message authentication code (i.e., a code that can only be generated by one in possession of the key). Some input to the encryption/authentication process is incremented in a manner known to both the transmitter and the receiver with the transmission of each message. That is, each time a command is transmitted from the RKE transmitter to the receiver in the motor vehicle, some input is incremented to insure that the encrypted message or authenticator changes with each transmission. By using the rolling code, the system cannot be defeated by simply intercepting a transmission and repeating it later. There are many ways to implement rolling code encryption. In one form of the rolling code both the RKE transmitter and the receiver are set to an initial code seed and rolling algorithm. Every time a command message is sent from the RKE transmitter to the receiver, both the RKE transmitter and the receiver update the code according to the rolling algorithm. Because the receiver will not always receive a transmission from the RKE transmitter (a blind transmission), for example when the receiver is beyond the range of the RKE transmitter, the receiver must be able to look ahead and react to codes that are within an acceptable future code window. Some mechanism must be provided to resynchronize the RKE transmitter and the receiver if the transmitted code is not within the acceptable window. The need for resynchronization can occur, for example, when a lost RKE transmitter is replaced or when for any other reason the transmitted code is outside the window. Such need for resynchronization is met by placing the RKE transmitter and the receiver in a training or program mode. The necessity for providing for a training mode, however, creates an additional security issue. During the training, the RKE transmitter must transmit the code secret, such as an encryption key, to the receiver. An unauthorized person in possession of the RKE transmitter could place the RKE transmitter in the training mode and cause the RKE transmitter to transmit the secret information. The unauthorized person could record the secret information and use it to gain access to the motor vehicle at a later time. Although there are a multitude of methods for implementing a rolling code encryption method for a motor vehicle remote keyless entry system, all of those methods are susceptible to the security issues presented by the necessity for a training mode.

Accordingly, it is desirable to provide remote keyless entry devices, systems and methods that overcome the security issues attendant with prior devices, systems, and methods. Furthermore, other desirable features and characteristics of the present invention will become apparent from the subsequent detailed description and the appended claims, taken in conjunction with the accompanying drawings and the foregoing technical field and background.

BRIEF SUMMARY

A remote keyless entry device is provided for sending secure commands such as for locking and unlocking a motor vehicle. In accordance with one embodiment of the invention the remote keyless entry device comprises a key generating key, encryption means, and a transmitter. The key generating key is stored in and never transmitted from the remote keyless entry device. The encryption means uses the key generating key to generate a working key. The transmitter is configured to send a command encrypted with the working key.

A secure method is provided for sending an encrypted command from a remote keyless entry device to a receiver in a motor vehicle. A key generating key is defined within the remote keyless entry device, and that key generating key is used to generate a working key. The working key is transmitted from the remote keyless entry device to the receiver during a training session without transmitting the key generating key. After the training session, a message encrypted with the working key can be transmitted from the remote keyless entry device to the motor vehicle receiver. Decryption means within the receiver decrypt the transmitted message using the working key.

BRIEF DESCRIPTION OF THE DRAWINGS

The present invention will hereinafter be described in conjunction with the following drawing figures, wherein like numerals denote like elements, and wherein FIG. 1 schematically illustrates a secure remote keyless entry system 10 in accordance with one embodiment of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
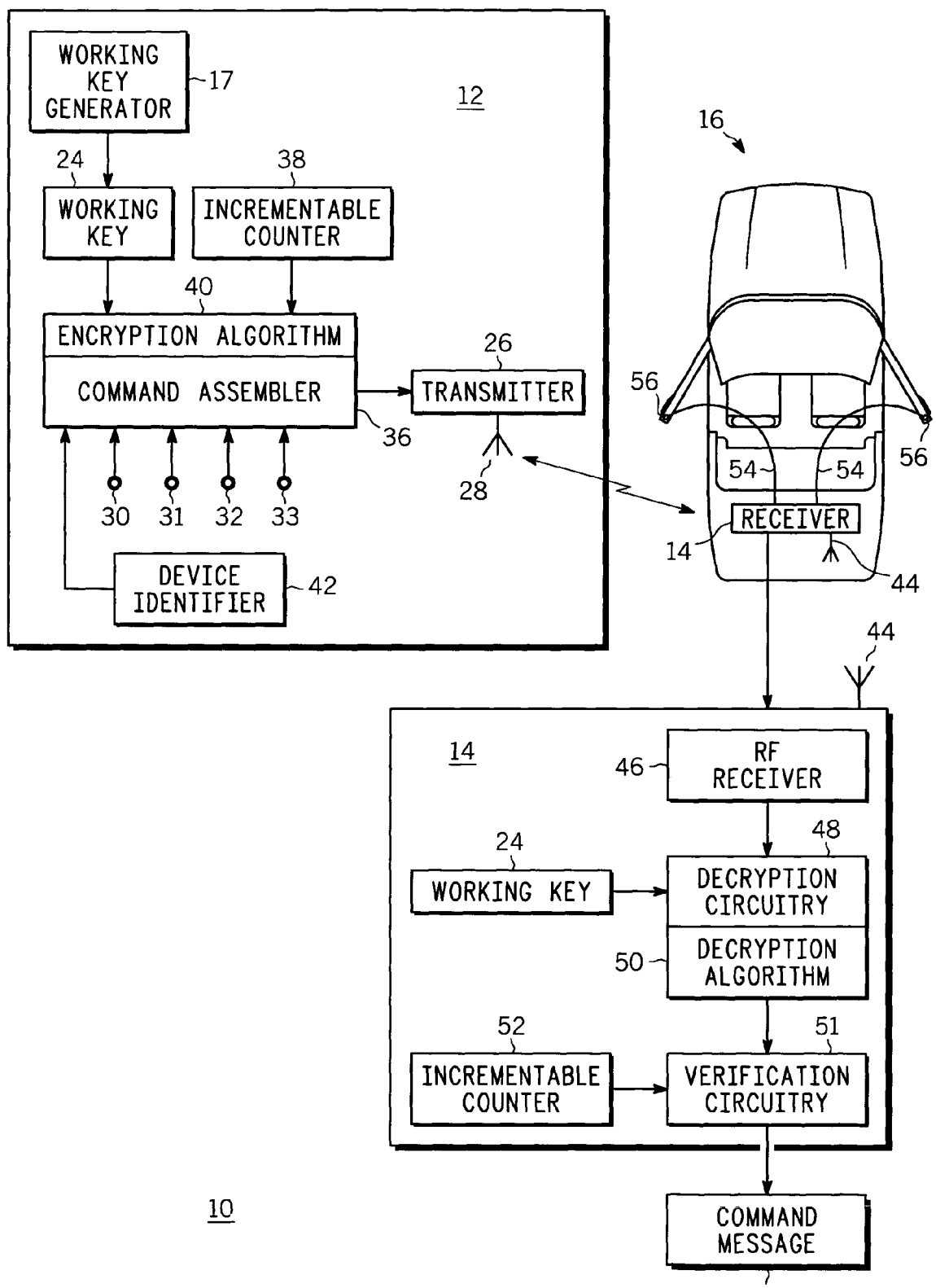

FIG. 1 schematically illustrates a secure remote keyless entry system 10 in accordance with one embodiment of the invention. System 10 includes a remote keyless entry device (RKE transmitter) 12 configured to transmit a secure command to a receiver 14 in a motor vehicle 16.

RKE transmitter 12 includes, in accordance with the invention, a working key generator 17 for generating a working key for encrypting a command transmitted from the RKE transmitter to receiver 14. As illustrated schematically in FIG. 2, the working key generator includes a key generating key 18 that is RKE transmitter specific. That is, key generating key 18 is unique to a particular RKE transmitter. Key generating key 18 provides one input to encryption circuitry 20. In accordance with one embodiment of the invention, an incrementable counter 22 provides a second input to encryption circuitry 20. Preferably counter 22 is a non volatile counter. The encryption circuitry can be any circuit that implements an encryption algorithm such as a block encryption algorithm. Other encryption algorithms can also be employed. Although described as encryption circuitry, the function can be embodied in hardware or software in known manner. Regardless of how embodied, the functional embodiment will be referred to herein, without limitation, as a circuit. Similarly, counter 22 can be a circuit or software that incrementally generates numbers in known manner. Regardless of form, each of the sources of incremented numbers will be referred to herein, without limitation, as a counter, and more specifically as an incrementable counter. Encryption circuitry 20 combines key generating key 18 with the output of counter 22 to generate a working key 24. As will be explained more fully below, a different working key is generated each time the remote keyless entry system is configured in the training mode. In the embodiment described above, different working keys are generated by incrementing counter 22. A different working key is generated for each output of the incrementable counter. In accordance with one embodiment of the invention, the key generating key and the encryption circuitry together are configured as a pseudorandom number generator and the working key is a pseudorandom number. The pseudorandom number that is generated changes with each training session because the output of incrementable counter 22 is changed with each training session. Other mechanisms can be used to cause the pseudorandom number generator to generate a different pseudorandom number and hence a different working key each time a training session is enabled. In accordance with a further embodiment of the invention, the encryption circuitry and the key generating key are configured as a random number generator and the resulting working key is a random number. Again, as above, the random number that is generated changes with each training session because the output of incrementable counter 22 is changed with each training session. As those skilled in the art will appreciate, the generation of a random number is more difficult than the generation of a pseudorandom number, but provides a greater degree of security.

Referring again to FIG. 1, the RKE transmitter also includes a transmitter 26 and an antenna 28. Transmitter 26 can be, for example, a low power radio frequency (RF) transmitter. Transmitter 26 can also be an infrared (IR) transmitter or other form of transmitter capable of transmitting information by the modulation of electromagnetic radiation. Antenna 28 must be compatible with the form of transmitter selected. For example, if transmitter 26 is an IR transmitter, antenna 28 might be a lens or other optical device for steering the IR radiation. For ease of description, transmitter 26 will hereinafter be referred to, without limitation, as an RF transmitter. In accordance with one embodiment of the invention, RKE transmitter further includes a plurality of buttons 30–33 or other mechanisms for selecting a command to be transmitted to the motor vehicle. The commands with which the buttons are associated can be, for example, unlock the driver door, unlock all doors, lock all doors, unlock the trunk, and the like. Buttons 30–33 are coupled to provide input to a command assembler 36 within which the message that is to be transmitted is assembled. Command assembler 36 can be embodied in hardware or software. Also provided as an input to command assembler 36 is working key 24 generated by working key generator 17. RKE transmitter 12 encrypts the command message assembled in command assembler 36 using working key 24 and any of the known rolling code encryption techniques. In accordance with one embodiment of the invention, a rolling code encryption can be accomplished as follows. The output of an incrementable counter 38 configured to provide an incremented number output is provided as a further input to the command assembler. Incrementable counter 38 can be similar to incrementable counter 22 described above. The output of counter 38 and the selected command are used to make up a plaintext message that is to be encrypted and then transmitted. The plaintext message is encrypted using the working key in an encryption algorithm 40 within command assembler 36. Encryption algorithm 40 can be, for example, a block encryption algorithm or other know algorithm. Encryption algorithm 40 is preferably a nonlinear algorithm. A device identifier 42 such as a serial number may also be used as an input to the command assembler and as such becomes part of the plaintext message. Any part or all of the command message can be encrypted using encryption algorithm 40. The encrypted message is coupled to transmitter 26 and is transmitted to receiver 14.

Receiver 14 includes an antenna 44 coupled to an RF receiver 46 (or other type of receiver corresponding to the type of transmitter used in RKE transmitter 12) for receiving the encrypted command message from the RKE transmitter. In accordance with one embodiment of the invention, a two step reception process is carried out within receiver 14. The two step process includes decryption and verification. First the working key is used to decrypt the received message to recover the plaintext and then the received message is verified. Coupled to receive the output of RF receiver 46 is decryption circuitry 48. The decryption circuitry can be embodied in either hardware or software. Included in decryption circuitry 48 is a decryption algorithm 50 that reversed the encryption done by encryption algorithm 40. Inputs to the decryption circuitry are the encrypted command message received by RF receiver 46 and working key 24. The output of the encryption algorithm is used as one input to verification circuitry 51. A second input to the verification circuitry is the output of an incrementable counter 52 that is synchronized with incrementable counter 38. Incrementable counter 52 can be similar to incrementable counters 22 and 38 described above. The verification circuitry checks to see if the recovered counter value from the transmitted message is within an acceptable window defined by the value of the output of counter 52 plus some acceptable incremental count. If the counter outputs match, the received message is verified to be a valid message from a valid transmitter, and is outputted as a plaintext command message 53 corresponding to the plaintext message originally encrypted by encryption algorithm 40. Command message 53 generates appropriate signals that are transmitted, for example by a local area network or by a wiring harness illustrated by numeral 54, to door locks 56, and the like.

The transmission of a message from the RKE transmitter to the motor vehicle can be accomplished by the following method, explained with continued reference to FIG. 1. In accordance with one embodiment of the invention, the plaintext command message created in an RKE transmitter 12 is based on a command generated in response to input from the individual possessing the RKE transmitter and the output of an incrementable counter 38. The individual possessing the RKE transmitter is usually the owner of the motor vehicle or other authorized user. The input from that individual is generated, for example, by pushing one of buttons 30–33 on the RKE transmitter. The plaintext command message may also include an identifier 42 identifying the particular RKE transmitter. Part or all of the command message is encrypted by an encryption algorithm 40 using a working key 24. The output of the encryption algorithm, a ciphertext version of the command message, is transmitted by transmitter 26 to a receiver 14 in motor vehicle 16. Each time a message is transmitted by transmitter 26, incrementable counter 38 is incremented so that the next command message encrypted by the working key and transmitted by transmitter 26 will include a different incrementable counter output. That is, the encrypted message changes for each subsequent command message transmission. Upon receipt by receiver 14 of a cipher message transmitted by transmitter 26, decryption circuitry 48 decrypts the message to retrieve the plaintext command message. The decryption circuitry is configured with decryption algorithm 50 to reverse the encryption process of encryption algorithm 40 and to recover the output of incrementable counter 38 which has been included in the transmitted message. Incrementable counter 52 is initially synchronized to incrementable counter 38. Each time a message is received by receiver 14, decrypted by decryption circuitry 48, and verified as a valid message from a valid transmitter by verification circuitry 51, incrementable counter 52 is resynchronized to the value of incrementable counter 38 that was received in the encrypted message. The inputs to decryption circuitry 48 are the working key 24, and the ciphertext command message received by receiver 14. The manner in which decryption algorithm 50 receives the correct working key is described below. By incrementing incrementable counter 38 each time a message is transmitted by transmitter 26 and by resynchronizing incrementable counter 52 each time a message is received by receiver 14, decrypted by decryption circuitry 48, and verified to be a valid message, the two incrementable counters 38 and 52 stay substantially synchronized. Because incrementable counter 38 may be incremented without a corresponding incrementing of incrementable counter 52, for example by a blind transmission by transmitter 26, verification circuitry 51 is configured to accept messages based upon the current output of incrementable counter 52 as well as a predetermined window of future counts. Each time a message is successfully verified by verification circuitry 51, incrementable counters 38 and 52 are resynchronized.

The working key is used by and hence must be known by both the encryption circuitry and the decryption circuitry. The working key must be transmitted from the RKE transmitter to the receiver in the motor vehicle during a programming or training session. An effective remote keyless entry system must allow for multiple training sessions, for example to eliminate the need to replace transmitters if the receiver needs to be replaced. In prior art systems, the training process is a potential security issue. If an unauthorized individual gains temporary possession of the RKE transmitter (for example a valet at a valet parking facility), that individual might cause the RKE transmitter to go into its training mode and cause the prior art RKE transmitter to transmit its secret information including the encryption key. If this information was recorded by the unauthorized user, the information could be used at a later time to generate a valid keyless entry message to gain unauthorized access to the motor vehicle. The remote keyless entry system and method of the present invention overcome such a security issue while still allowing multiple training sessions.

Figure 2:
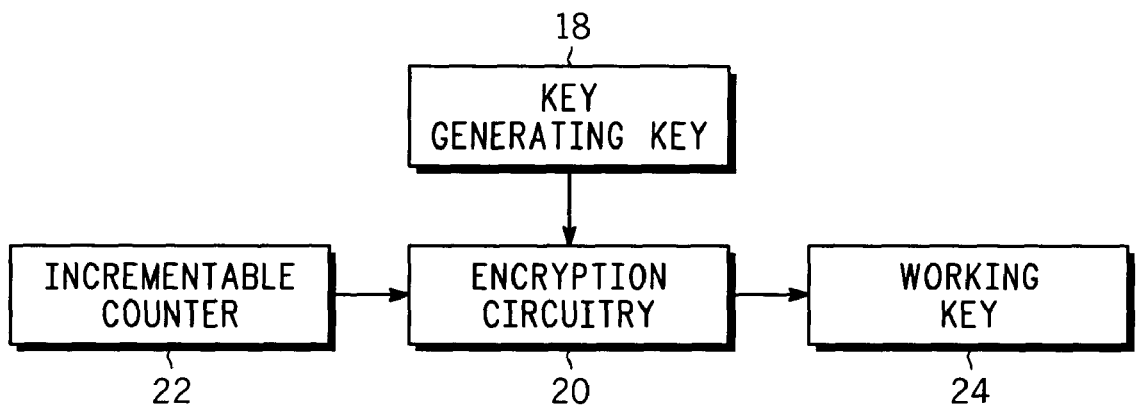
FIG. 2 schematically illustrates a working key generator in accordance with one embodiment of the invention.
Figure 3:
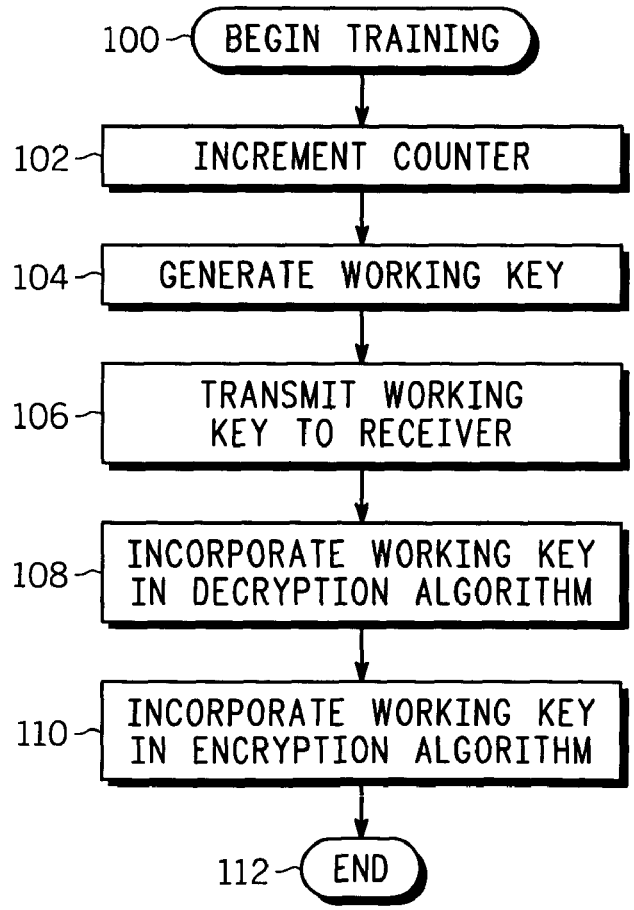
FIG. 3 illustrates, in flow chart format, a method for generating a working key in accordance with one embodiment of the invention.

The method for generating a working key in accordance with one embodiment of the invention is illustrated in flow chart format in FIG. 3 with continued reference to FIGS. 1 and 2. A cryptographic process is used to generate a stream of secure pseudorandom numbers which are then used as the shared information, i.e., the working keys, for the secure remote keyless entry system. Working key generator 17 includes a key generating key 18 such as an n-bit number that is loaded at the time of assembly at the factory or that can be selected and installed by the owner. The key generating key is unique and specific to one particular RKE transmitter. The key generating key, in accordance with the invention, is never transmitted, even during a training session. Working key generator 17 also includes a non volatile incrementable counter 22 that is configured to generate a series of incremented numbers. The list of incremented numbers produced by the counter is sufficiently long to prevent an unauthorized possessor of the RKE transmitter from recycling the counter within a reasonable period of time. As illustrated in FIG. 3, the process of training the transmitter and receiver in accordance with one embodiment of the invention begins at step 100. The non volatile counter is incremented to output an incremented number (step 102), i.e., a number unique to this training session. The key generating key and the incremental number output from non volatile counter 22 are combined (step 104) in encryption circuitry 20 using the encryption algorithm embodied therein to produce a working key 24. The output of the working key generator can be coupled directly to transmitter 26 for transmission (step 106) to receiver 14. The receiver incorporates the working key into the decryption algorithm embodied in the decryption circuitry (step 108). The output of the working key generator, working key 24, is also incorporated into encryption algorithm 40 in the RKE transmitter (step 110). The training session is then terminated (step 112). During the training session, only the working key is transmitted, not the key generating key. Each training process results in a new working key because the non volatile counter increments during each training session, outputting a new incremented number used in the generation of the new working key. Even if an unauthorized user has a complete description of the encryption algorithm, gains possession of the RKE transmitter, and is able to put it into the training mode, the information that can be gained will not provide access to the motor vehicle either currently (because the receiver would still be using the previous working key) or in the future (because any reprogramming undertaken by an authorized user would also result in the use of a different working key). The unauthorized user will be unable to generate either past or future keys because the ability to generate working keys depends on the key generating key which is kept secret and never transmitted.

Although not illustrated, the training session can also be used to synchronize incrementable counters 38 and 52. Such synchronization can also be accomplished in other know methods.

In the foregoing, various elements have been described as "circuitry" and certain functions have been described as being implementable in either hardware or software. The various elements and functions can be implemented, for example, with a general purpose microcontroller unit (MCU) programmed in a known manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof. For example, only one method has been described for implementing a rolling code encryption system. The invention is equally applicable to other rolling code systems that use a shared secret between a transmitter and a receiver. Further, those of skill in the art will recognize that other encryption algorithms can be used in implementing the inventive system and method.

The invention claimed is:

1. A secure method for sending an encrypted command from a remote keyless entry device to a receiver in a motor vehicle comprising the steps of:
    defining a key generating key within the remote keyless entry device;
    generating a working key from the key generating key;
    transmitting the working key from the remote keyless entry device to the receiver during a training session without transmitting the key generating key; and
    transmitting a message encrypted with the working key from the remote keyless entry device to the receiver.

2. The secure method of claim 1 wherein the step of generating a working key comprises the step of using an encryption algorithm to combine an output of an incrementing mechanism with the key generating key.

3. The secure method of claim 2 wherein the incrementing mechanism comprises a first counter and wherein the method further comprises the steps of:
    incrementing the first counter to provide an incremented output of the first counter; and
    generating a new working key each time the remote keyless entry device enters a training session.

4. The secure method of claim 3 further comprising the steps of:
    incrementing a second counter in the remote keyless entry device to provide a second incremented output each time a message is transmitted from the remote keyless entry device and
    synchronizing a third counter in the motor vehicle to provide a third incremented output each time a message transmitted by the remote keyless entry device is received by the receiver and verified to be a valid message.

5. The secure method of claim 4 wherein the step of transmitting a message comprises the step of transmitting a message comprising an encrypted version of the second incremented output.

6. The secure method of claim 5 further comprising the steps of:
    decrypting the message at the receiver using the working key; and
    verifying the validity of the message using the third incremental output.

7. The secure method of claim 6 wherein the step of verifying comprises the step of comparing a third incremented output to the second incremented output.

8. The secure method of claim 2 wherein the step of using an encryption algorithm comprises the step of using a block encryption algorithm to combine the output of the incrementing mechanism with the key generating key.

9. The secure method of claim 1 wherein the step of transmitting a message comprises the step of transmitting a message comprising a command and an identifier.

10. A secure remote keyless entry system for a motor vehicle comprising:
    a remote keyless entry device comprising a key generating encryption key configured to generate a working key and a transmitter configured to transmit a ciphertext command encrypted with the working key without transmitting the key generating key; and
    a receiver positioned in the motor vehicle and configured to receive and decrypt the ciphertext command encrypted with the working key.

11. The secure remote keyless entry system of claim 10 wherein the remote keyless entry device further comprises encryption circuitry and the receiver comprises decryption circuitry.

12. The secure remote keyless entry system of claim 11 further comprising a first incrementable counter configured to provide an incrementable output and wherein the incrementable output, the working key, and a plain text command comprise inputs to the encryption circuitry.

13. The secure remote keyless entry system of claim 12 further comprising a second incrementable counter configured to provide a second incrementable output for verifying the validity of the received ciphertext command.

14. A remote keyless entry device for a motor vehicle comprising:
    a key generating key stored in and never transmitted from the remote keyless entry device;
    a non volatile counter configured to provide an incrementable output;
    an encryption circuit coupled to receive the key generating key and the output of the non volatile counter and configured to generate a working key; and
    a transmitter configured to send a command message encrypted with the working key.

15. The remote keyless entry device of claim 14 wherein the transmitter can be further configured in a training mode for transmitting the working key to a receiver in a motor vehicle.

16. The remote keyless entry device of claim 14 further comprising a second counter having an output, a device identifier, and a plurality of command selections, and wherein the transmitter comprises a transmitter configured to transmit a command message comprising an encrypted version of the output, the device identifier, and one of the plurality of command selections.

17. A method for sending an encrypted command from a remote keyless entry device comprising a key generating key that is never transmitted from the remote keyless entry device, an incrementable first counter, encryption circuitry, a second incrementable counter, a device identifier, a plurality of command selections, and a transmitter to a receiver in a motor vehicle comprising decryption circuitry and an incrementable third counter, the method comprising the steps of:

generating a working key from the key generating key and an output of the incrementable first counter using an encryption algorithm;

transmitting the working key from the remote keyless entry device to the receiver during a training session;

transmitting a command message to the receiver, the command message comprising an output of the second incrementable counter, the device identifier, and one of the plurality of command selections at least a portion of which are encrypted by the encryption circuitry using the working key;

receiving the command message at the receiver;

decrypting the command message by the decryption circuitry using the working key; and verifying the validity of the command message using an output of the incrementable third counter.

18. The method of claim 17 further comprising the steps of:

incrementing the second incrementable counter each time the transmitter transmits a command message; and synchronizing the incrementable third counter to the second incrementable counter each time the receiver receives a valid command message.

19. The method of claim 17 wherein the step of generating a working key comprises the step of generating a working key from the key generating key and an output of the incrementable first counter using an encryption algorithm.

20. The method of claim 19 wherein the step of generating a working key comprises the step of generating a working key from the key generating key and an output of the incrementable first counter using a block encryption algorithm.

21. A rolling code remote keyless entry system for a motor vehicle comprising:

a remote keyless entry transmitter;

a key generating key stored in the remote keyless entry transmitter, the key generating key never transmitted from the remote keyless entry transmitter;

an incrementable counter in the remote keyless entry transmitter having an output;

a mechanism in the remote keyless entry transmitter for generating a working key from the key generating key and the output; and a transmitter configured to transmit the working key to a receiver, and to send a command message encrypted with the working key.

22. A rolling code remote keyless entry system for a motor vehicle comprising:

a key generating key stored in a remote keyless entry device and never transmitted from the remote keyless entry device;

a number generator configured to generate a number for use as a working key, the number comprising a number selected from the group consisting of random numbers and pseudorandom numbers and based on the key generating key;

a transmitter configured to transmit the working key to a motor vehicle during a training session, and to send a command message encrypted with the working key.

\* \* \* \* \*